United States Patent [19]

Smith

[11] Patent Number: 5,657,145
[45] Date of Patent: Aug. 12, 1997

[54] MODULATION AND CODING FOR TRANSMISSION USING FLUORESCENT TUBES

[75] Inventor: Michael Smith, Hertford, England

[73] Assignee: BSC Developments Ltd., England

[21] Appl. No.: 454,328

[22] PCT Filed: Oct. 14, 1994

[86] PCT No.: PCT/GB94/02256

§ 371 Date: Jul. 19, 1995

§ 102(e) Date: Jul. 19, 1995

[87] PCT Pub. No.: WO95/11558

PCT Pub. Date: Apr. 27, 1995

[30] Foreign Application Priority Data

Oct. 19, 1993 [GB] United Kingdom ............ 9321535

[51] Int. Cl.$^6$ ............................................. H04B 10/04
[52] U.S. Cl. ............................ 359/181; 359/184; 375/238
[58] Field of Search ........................... 359/181, 184–186; 375/238, 237, 239, 353, 309, 315; 315/129, 291; 341/178, 182; 370/8–9, 11; 372/38

[56] References Cited

U.S. PATENT DOCUMENTS

| 3,900,404 | 8/1975 | Dachs | 250/199 |
| 4,713,841 | 12/1987 | Porter et al. | 375/238 |
| 5,424,859 | 6/1995 | Uehara et al. | 359/172 |

FOREIGN PATENT DOCUMENTS

| 1019632 | 11/1952 | France. |
| 8802203 | 3/1988 | WIPO. |
| 9107011 | 5/1991 | WIPO. |

*Primary Examiner*—Kinfe-Michael Negash
*Attorney, Agent, or Firm*—Bierman, Muserlian and Lucas

[57] ABSTRACT

A method of transmitting a series of data elements by means of a series of discrete signal pulses separated by intervals, wherein the data elements are of a number of discrete types and are each represented by a respective interval between successive signal pulses, and wherein a number of further intervals, each different from the intervals assigned to data elements and different from the sums of or differences between any two data element intervals, is defined wherein each of the further intervals represents a change in the series of data elements from one element type to another, the number of further intervals being less than the number of different data element types.

7 Claims, 1 Drawing Sheet

MODULATION AND CODING FOR TRANSMISSION USING FLUORESCENT TUBES

The present invention relates to signalling techniques, and particularly relates to the transmission of a coded digital signal using pulsed amplitude modulation of a carrier wave. Data transmission using visible light in a building is achieved, according to the invention, which provides a method of sending digital information by modulating the output from gas discharge lamps commonly found in electric lighting installations.

A typical application of such a method would be in the dissemination of information to the individual shelf units of an electronic pricing display system as used in large retail outlets.

Japanese laid open applications numbered 60-32444, 60-32460, and 60-32443 describe a system where in-plant fluorescent lighting may be frequency modulated to form a data transmission path, and mention the use of frequency shift keying as a possible coding method. PCT published application WO 90/13067 describes an electronic price labelling system which features a further application of frequency modulation of fluorescent lighting systems by phase modulation of the whole electrical supply to the lighting. There are also various infrared data transmission methods and applications to be found in the literature that describe optical data transmission applications. For example, U.S. Pat. 4,766,295 by Davis et al describes an electronic pricing display system where optical transmitter heads are installed over the ceiling and are used to signal to infrared sensitive pricing labels.

The present invention seeks to provide a data transmission method which employs amplitude modulation of the light output from a discharge lamp, using a pulse position coding method that overcomes many of the practical problems encountered with the known systems.

The conventional fluorescent lamp used for area illumination is a low pressure gas discharge tube wherein the gas mixture has been chosen to give efficient output in the short to ultra violet wavelengths. This effect is normally achieved by mercury doping. The tube is internally coated with a fluorescing powder that converts the short wavelength emissions into useful light, the fluorescent material having a degree of persistence after illumination. The constituents of the fluorescing powder can be chosen to provide a particular colour of light output. Usually, a mixture which produces as near as possible to white light is chosen.

The electrical characteristic of a gas discharge tube is to exhibit very low or negative resistance when operating, and therefore some method of limiting the current flow through the tube must be employed. With AC mains power supplies this is simply done by incorporating a suitably sized inductance in series with the tube. Nearly always the resulting phase shift is corrected by incorporating a capacitor in parallel with the whole tube and inductance. This current limiting circuit is known as a ballast. A more complex method of current limiting uses an electronic frequency changer (electronic ballast) for each tube, whereby a number of approaches to limit the current flow are then available. Although this hardware is more expensive than the inductance and capacitor installation, the resulting running costs are much lower because the electronic ballast can be designed to operate with very low losses.

The light output from fluorescent tubes driven by these AC circuits consists of two distinguishable elements; a constant, or dc element, and a varying, or 'ac' element, where the frequency of the latter is $2f_m$ ($f_m$ being the supply frequency to the tube). In other words, what appears to the eye to be a constant light output in fact comprises a rectified ac element associated with a constant element. What is happening is that while the current flow reverses every half cycle of $f_m$, the intensity of the emissions from the gas discharge are, of course, not affected by the direction of flow. In effect the intensity of the emissions from the gas must drop to zero as the current reverses and itself goes through zero. The fluorescing powders used in the tubes possess long and short persistence features so whilst most of the light output results from the long persistence feature, and is substantially constant, the light resulting from the short-term persistence fluorescent materials follows more closely the actual intensity of the gas discharge and thus provides an element of the light output which varies in-intensity, following the changes in current amplitude.

It is now clear that by varying $f_m$ according to phase or frequency, as proposed by the U.S. and Japanese documents referred to above respectively, a data channel could be formed. In practice, however, this is quite difficult to achieve.

The present invention seeks to overcome these difficulties by modulating not the frequency but the amplitude of the 'ac' light output element. It has the advantage that it can be applied to existing lighting installations at quite low cost and does not require the installation of separate optical emitters as required for infrared transmissions systems.

It has been found that by modifying the current flow in a fluorescent tube, for a suitable length of time, amplitude modulation of the ac light output element is possible without causing noticeable and annoying flicker. This 'undetectable' modulation of the light is usable as a transmission channel simply because it can in fact be detected by instruments more sensitive than the eye.

According to the present invention, a method of data transmission using a fluorescent light source powered by an alternating current comprises interrupting the current to the light source for a period sufficiently short as not to effect the 'constant' element of the light output, but sufficiently long to cause a reduction in the 'ac' variable element of the light output, and to adjust the intervals between such interruptions so that coded data elements corresponding to said intervals may be transmitted.

Since any detection device will have a finite limit on its sensitivity, the interruptions in the current will have to be sufficient to produce a 'dip' in the light output which is detectable as a data transmission modulation.

It seems that the low persistence feature of a part of the fluorescing powder enables the tube to respond to the short interruptions envisaged.

The method of the invention will now be described in detail with reference to the accompanying diagram in which.

Figure 1A:
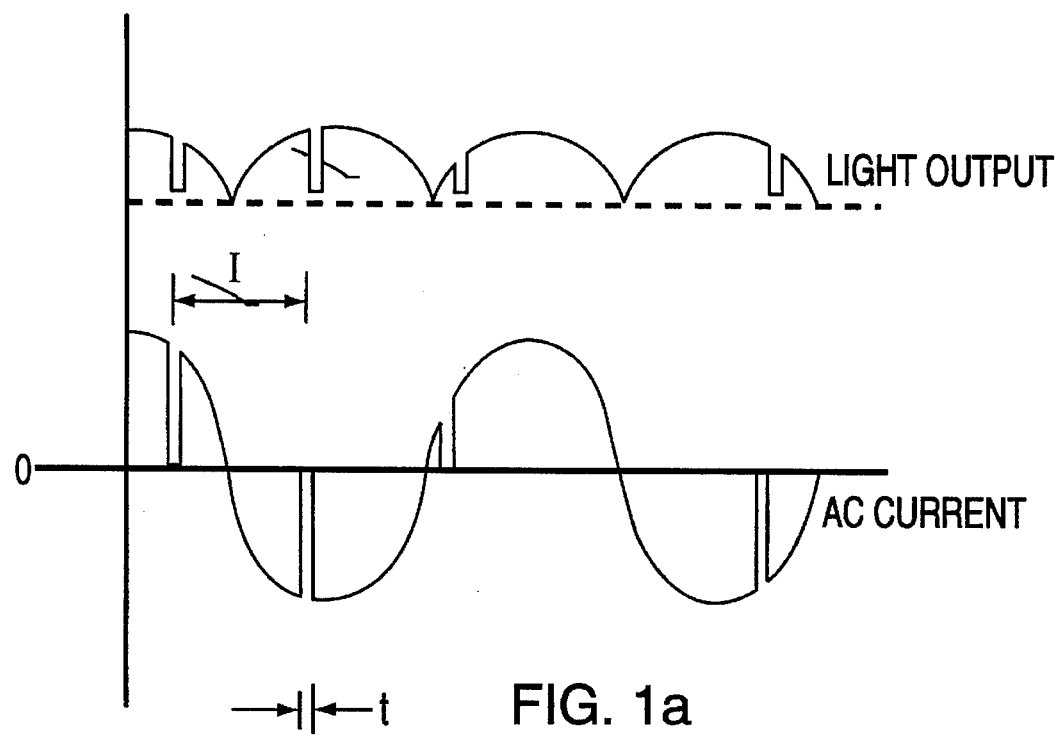
FIG. 1a shows an idealised diagram of the effect.
Figure 1B:
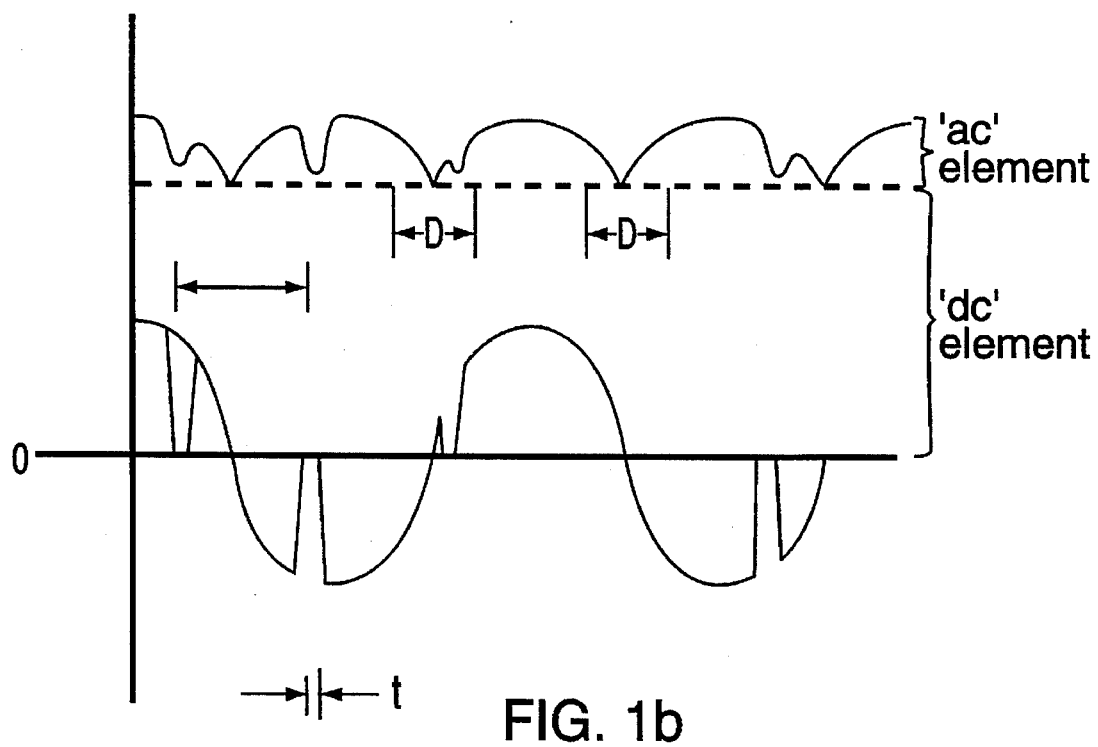
FIG. 1b depicts a practical case where 100% depth of modulation is not, in fact, achievable.

Referring now to the Figures, the lower trace in each diagram represents the AC current supplied to the lamp, preferably a fluorescent tube. The upper trace shows the amplitude of the total light output.

The signalling is achieved by 'quenching' the current to the lamp by simply short circuiting the lamp for a short period of, say, 100 microseconds. These quenchings are seen in the Figures as the periods t of zero current in the respective lower traces.

Each such quenching gives rise to a reduction in the light output from the lamp, but due to the long persistence of some of the fluorescent material as compared to the short duration t of the quenching episodes, the reduction or modulation is effected almost exclusively in the ac element of the light output and does not noticeably extend into the dc element. Since this variable or 'ac' element of the light output periodically has zero magnitude, then for a time on each side of each such zero event there is an area of the ac element which is unusable for signalling purposes since the modulation around the zero crossings is too small to be detected with certainty. Effectively there is a dead band D for signalling imposed by the zero crossing. The invention employs redundancy techniques in the pulse position code to overcome the uncertain availability of signalling during each dead band D.

Modulating the current through the tube can be advantageously done by applying an electronic switch in parallel with the tube. When the switch is 'on' the tube current is quenched, typically for a period of 100 microseconds. This method is also beneficial for practical reasons in that it is easy to retro-fit such a modulation switch to existing lighting fitting. This is especially true where the tube circuit includes a parallel 'starter' in which case a modulator unit can simply replace this, provided the tube starting function is made available within the modulator unit.

The existence of dead bands having a relatively long duration leads to the situation where a significant proportion of the quenching events may occur during dead bands, and thus the associated 'dips' in the light output will be undetectable.

In practice the dead band D extends for a period which is an order of magnitude greater than the signalling pulse width I therefore it is inevitable that some dips will not be seen by the receiving device. It is possible to overcome this by carefully choosing the coding method. When a carrier wave with no dead bands is used, digital data transmission using the interval between successive discrete pulses or dips in the carrier wave can be achieved by assigning two different intervals between pulses to represent the binary states 0 and 1 and thus enable digital information transfer. This will not work where dead bands occur, since if a single dip or pulse is lost, then the interval between the pulses either side of the lost pulse will equal the total of either two '1' data elements or two '0' data elements, in which case the data stream is decodeable, or it will equal the sum of a '1' and a '0' element, in which case there is no means of discriminating the series 1.0 from the series 0.1 if the middle dip or pulse is lost in a dead band.

To overcome this difficulty, the method of the present invention introduces a third interval between successive dips or pulses to signify a change of storm between two successive data elements, the interval indicating a change of state being preferably less than the difference between the intervals representing the '1' and '0' data elements. The 'difference' interval may be inserted between adjacent data elements of different binary significance, or it may be inserted after the second data element of a pair having different significance.

Representing this symbolically

I is a pulse $t_0$ codes the 0 bit $t_1$ codes the 1 bit $t_c$ codes the change event then the binary string 1 1 1 1 0 0 0 0 (changing from a string of ones to a string of zeros) could be represented in time periods as:

$I_0 t_1 I_1 t_1 I_2 t_1 I_3 t_1 I_4 t_c I_5 t_0 I_6 t' \ O_7 t_0 I_8 t_0 I_9$

Clearly, if $I_1$ is missing then the resulting period from $I_0$ to $I_2$ is $2t_1$, identified as the string of data elements 1 1; similarly an interval of $2t_0$ between two detected pulses would represent the data string 0 0.

If $I_4$ missing then $I_2 t_1 I_3 (t_1+t_c) I_5 t_0 I_6$ would be interpreted as 1 1 1 0

If $I_5$, is missing then $I_3 t_1 I_5 (t_c+t_0) I_6 t_0 I_7$ would be interpreted as 1 0 0

A similar situation arises for the zero to one transition.

Note that the code has error detecting properties in that sequences such as $t_1 I(t_1+t_c) I t_1$ would be meaningless.

Further, the method can cope with the absence of both $I_4$ and $I_5$, since $I_2 t_1 I_3 (t_1+t_c+t_0) I_6 t_0 I_7$ unambiguously represents 1 1 0 0 and not 1 0 1 0 since there is only one change period, $t_c$, included in the sequence.

A variation on his approach is to add the period $t_c$ to each of the periods representing 1 and 0 giving four different intervals. These four distinct periods would represent bit 1, bit 0, transition from 1 to 0 and transition from 0 to 1, respectively. The advantage here is that the channel theoretically support a higher date rate and the logical state machine needed to track the transitions is simpler, but this encoding method is most effective where the ratio of dead band time to signalling time is large.

As an alternative to signalling a change of data state with a $t_c$ pulse interval, a simplified transmission which is nevertheless proof against single missing pulses comprises designating an interval $t_1$ between two pulses to designate data state 1, and designating data state 0 to be represented by two consecutive intervals $t_0$, where $t_0$ cannot of course equal half of $t_1$. Thus, even if a pulse is omitted, the interval $2 \times t_0$ (where the pulse between two $t_0$ intervals is lost) must signify a zero, and the interval $t_1 33 t_c$ (where the pulse between a $t_1$ and a $t_c$ is lost) must signify a 1 either followed or preceded by a zero, with the interval either following or preceding the $(t_c+t_1)$ interval enabling logic to discriminate between 01 and 10 data streams.

A practical criterion for choosing the intervals is that they should be as different in length as possible, making decoding easier and more certain, and it must be ensured that the possible pairings of data elements must yield unique total periods when their intervals are summed. Thus, where there are n types of data element and thus there are $n^2$ possible pairings of successive data elements, (assuming that any type of data element may be followed by any type of data element) then there must be provided $n^2$ different intervals between the pulses enclosing each data element pairing. As an example of this technique, in the following illustration, the numbers 4 5 6 and 7 are chosen to represent four time intervals between successive pulses. To each of those four intervals, a unique meaning is allocated, for example N0, C0, C1 and N1 respectively, where: N0 means 'no change, insert a zero in the data stream' (must be preceded by CO or NO); CO means 'change to a zero, and insert a zero in the data stream' (must be preceded by either C1 or N1); Cl means 'change to a one, and insert a one in the data stream' (must be preceded by either CO or NO); N1 means 'no change, insert a one in the data steam' (must be preceded by C1 or N1) then the following combinations of successive periods in the data stream are possible; assuming that only one pulse in any successive two can be lost due to the dead bands.

1. N0;N0=8
2. C0;N0=9
3. N0;C1=10
4. C0;C1=11
5. C0;C1=11
6. N1;C0=12
7. C1;N1=13
8. N1;N1=14

All other combinations are meaningless and erroneous.

It can be seen that if only one pulse is missing it is possible to interpret the data stream because the resulting period between the pulses preceding and following the 'lost' pulse is unique and it can thus be determined what the data pair was meant to be. The pairings C0;C1 and C1;CO can be discriminated by noting what preceded the sequence and are dealt with by programmed logic. Combination 3 is a multiple of 10 which means that if the values correspond to milliseconds of interval between pulses, and event 3 occurs in syncronisation with the zero crossings a pulse in each of two successive dead bands would be lost, but since this must be followed by N1 or CO the synchronism is then broken and therefore the sequence is unambiguous.

It has been found in practice with a conventional fluorescent tube that 7 ms it exactly the available time between dead bands, and thus the above values, when assigned as milliseconds for the intervals between tube quenchings, could give rise to the situation wherein two or more pulses separated by 10 ms are lost when they occur in synchronisation with the dead bands of the tube.

Thus, in practice, each dead band is of approximately 3 ms duration, having a 7 ms 'window' for data transmission. Using the first encoding scheme explained above, wherein two different intervals are assigned to data elements 0 and 1 and a third, shorter, interval is assigned to a change of state, the minimum duration this third interval has been found to be half the dead band width, i.e. 1.5 ms, and clearly the third interval must not equal the difference between he intervals assigned to the data elements. This will ensure that no dead band can contain more than two signalling pulses, and thus decoding of the data stream will not be prejudiced.

When, in a binary data stream, four discrete intervals are assigned in accordance with the second example above, the existence of a 3ms dead band in a 50Hz AC powered lamp constrains the choice of intervals in such a way that no interval should be less than 3 ms, and no intervals should be a multiple of 10 ms.

I claim:

1. A method of transmitting a series of data elements by means of a series of discrete signal pulses separated by intervals, wherein the data elements are of a number of discrete types and are each represented by a respective interval between successive signal pulses, and wherein a number of further intervals each different from the intervals assigned to data elements and different from the sums of or differences between any two data element intervals, is defined wherein each of the further intervals represents a change in the series of data elements from one element type to another, the number of further intervals being less than the number of different data element types.

2. A method according to claim 1, wherein there are two data element types represented by first and second signal pulse intervals, respectively, and one further signal pulse interval.

3. A method according to claim 1, wherein there are two data element types represented by first and second signal pulse intervals, respectively, and two further signal pulse intervals.

4. A method according to claim 1, 2 or 3, wherein the signal pulses are discontinuities in an otherwise continuous carrier waveform.

5. A method according to claim 4, wherein the carrier waveform varies in amplitude cyclically, and the period of the carrier waveform is different from the pulse signal intervals of all the data element types and different from the further intervals.

6. A method according to claim 5, wherein the carrier waveform is the light input from a fluorescent light source, and the discontinuities are produced by momentarily short-circuiting the light source.

7. A method according to claim 5, wherein the fluorescent light source is powered by 50 or 60 Hz alternating current, and is short-circuited for approximately 100 microseconds to produce each discontinuity or signal pulse.

* * * * *

UNITED STATES PATENT AND TRADEMARK OFFICE
CERTIFICATE OF CORRECTION

PATENT NO. : 5,657,145
DATED : August 12, 1997
INVENTOR(S) : Michael Smith

It is certified that error appears in the above-indentified patent and that said Letters Patent is hereby corrected as shown below:

Column 3, line 50, change "storm" to --state--.

Column 4, line 6, change "1 1 1 0" to --1 1 0--; line 12, change "unambiquously" to --unambiguously--; line 18, after "channel" insert --can--; line 19, change "date" to --data--; line 30, change "33" to --+--; line 63, change "5. C0;C1=11" to --5. C1;C0=11--.

Column 5, line 16, change "it" to --is--; line 27, after "duration" insert --of--; line 29, change "he" to --the--.

Signed and Sealed this

Twentieth Day of January, 1998

Attest:

BRUCE LEHMAN

*Attesting Officer*    *Commissioner of Patents and Trademarks*